(12) United States Patent
Barbieri et al.

(10) Patent No.: US 8,321,456 B2
(45) Date of Patent: Nov. 27, 2012

(54) GENERATING METADATA FOR ASSOCIATION WITH A COLLECTION OF CONTENT ITEMS

(75) Inventors: Mauro Barbieri, Eindhoven (NL); Johannes Weda, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 170 days.

(21) Appl. No.: 12/681,132

(22) PCT Filed: Oct. 2, 2008

(86) PCT No.: PCT/IB2008/054013
§ 371 (c)(1),
(2), (4) Date: Apr. 1, 2010

(87) PCT Pub. No.: WO2009/047674
PCT Pub. Date: Apr. 16, 2009

(65) Prior Publication Data
US 2010/0274782 A1    Oct. 28, 2010

(30) Foreign Application Priority Data
Oct. 8, 2007    (EP) .................................. 07118031

(51) Int. Cl.
*G06F 17/30* (2006.01)
(52) U.S. Cl. .................. 707/771; 707/778; 707/780
(58) Field of Classification Search .............. 707/771, 707/778, 780
See application file for complete search history.

(56) References Cited

U.S. PATENT DOCUMENTS

| | | | |
|---|---|---|---|
| 6,374,260 B1 * | 4/2002 | Hoffert et al. ...................... 1/1 |
| 7,321,899 B2 * | 1/2008 | Saito et al. ............................ 1/1 |
| 2003/0233241 A1 * | 12/2003 | Marsh ................................ 705/1 |
| 2004/0003403 A1 * | 1/2004 | Marsh ............................... 725/53 |
| 2004/0177319 A1 * | 9/2004 | Horn ............................. 715/501.1 |
| 2006/0004712 A1 | 1/2006 | Hakala et al. |
| 2006/0020597 A1 | 1/2006 | Keating et al. |
| 2006/0184532 A1 * | 8/2006 | Hamada et al. ................. 707/10 |
| 2007/0055680 A1 * | 3/2007 | Statchuk ....................... 707/100 |
| 2007/0136286 A1 | 6/2007 | Webster et al. |
| 2007/0192352 A1 * | 8/2007 | Levy ............................. 707/102 |
| 2008/0021921 A1 * | 1/2008 | Horn ............................. 707/102 |
| 2008/0071771 A1 * | 3/2008 | Venkataraman et al. ......... 707/5 |
| 2008/0163056 A1 * | 7/2008 | Lamadon ..................... 715/716 |

FOREIGN PATENT DOCUMENTS
GB    2427291 A1    12/2006

OTHER PUBLICATIONS

Kuo et al: "Looking for New, Not Known Music Only: Music Retrieval by Melody Style"; Proceedings of the 2004 Joint ACM/IEEE Conference on Digital Libraries (JCKL'04), pp. 241-251.

* cited by examiner

*Primary Examiner* — Hanh Thai

(57) ABSTRACT

A method of automatically generating metadata for association with a collection of content items accessible to a system (1) for processing data included in the content items, includes obtaining sets of metadata associated with the content items individually, each set of metadata including at least one attribute value associated with the content item. At least one distribution of values of an attribute over the sets of metadata associated with the respective content items is analyzed. At least one attribute value is selected in dependence on the analysis. The selected attribute value(s) are processed to generate the metadata for association with the collection, and the generated metadata are made available to the system (1) for processing data included in the content items in connection with an identification of the collection of content items.

14 Claims, 2 Drawing Sheets

GENERATING METADATA FOR ASSOCIATION WITH A COLLECTION OF CONTENT ITEMS

FIELD OF THE INVENTION

The invention relates to a method of automatically generating metadata for association with a collection of content items accessible to a system for processing data included in the content items.

The invention also relates to a system for automatically generating metadata for association with a collection of content items.

The invention also relates to a computer program

BACKGROUND OF THE INVENTION

US 2006/0020597 is concerned with making use of visual image content evaluation to effect a variety of interactions with visual images, such as, for example, indexing of a collection of visual images, grouping of visual images of a collection of visual images, summarization of a collection of visual images, annotation of groups of visual images, searching for visual images and identification of a representative visual image from a group of visual images. Groups of visual images in a collection of visual images can be annotated by identifying an image representation for each of the groups, determining the similarity of each of the image representations to each of the other image representations, and annotating the groups of visual images based on the similarity of each image representation to the other image representations. The image representation for a group of visual images can be an average of one or more image characteristics for all visual images of the group of visual images.

A problem of the known method is that the average value of an image characteristic is often not meaningful. In particular for large groups of images, the average value of the image characteristic will tend to be the median value of the range of possible values of the characteristic. This makes the annotation less suitable for browsing and searching hierarchically organized visual images.

SUMMARY OF THE INVENTION

It is an object of the invention to provide a method, system and computer program of the types mentioned in the opening paragraphs above that are suitable for generation, with a minimum of human intervention, or none at all, of an efficient representation of collections of content items for rapid location of such collections by a system for processing the content items.

This object is achieved by the method according to the invention, which includes:

obtaining sets of metadata associated with the content items individually, each set of metadata including at least one attribute value associated with the content item, analyzing at least one distribution of values of an attribute over the sets of metadata associated with the respective content items, selecting at least one attribute value in dependence on the analysis, processing the selected attribute value(s) to generate the metadata for association with the collection and making the generated metadata available to the system for processing data included in the content items in connection with an identification of the collection of content items.

In the present context, metadata is taken to mean structured encoded data that describes characteristics of information-bearing entities.

By processing the selected attribute value(s) to generate the metadata for association with the collection, a more efficient representation is obtained, compared, for example, to selection of a representative content item or an exhaustive list of all the content items' metadata. By selecting attribute values, rather than using all attribute values, the generated metadata is made relatively expressive. By selecting the attribute values based on an analysis or analyses of at least one distribution of values of an attribute over the sets of metadata associated with the respective content items, it is made possible to select attribute values pertinent to the collection. Moreover, steps of analyzing distributions of values and selecting an attribute value or attribute values are suitable for being carried out automatically, so that user intervention is not necessary in principle. By making the generated metadata available to the system for processing data included in the content items in connection with an identification of the collection of content items, it is made possible for a user of the system to locate relevant content items more efficiently and accurately, by first locating the collection of content items and then, optionally, individual content items in the collection.

An embodiment includes identifying the content items included in the collection using data maintained by a hierarchical file system.

An effect achieved is that an automated system is capable of carrying out the method of identifying the members of the collection relatively easily without human intervention at the point of generating the metadata. That is to say that there is no need for a human to provide input data for defining the collection. A hierarchical file system provides for the organization of content items into directories and sub-directories—or an analogy such as nested folders—each of which represents a collection.

In an embodiment, selecting at least one attribute value in dependence on the analysis includes selecting at least one value of fewer than all attributes having values included in sets of metadata associated with content items in the collection individually.

An effect is that a concise description of the collection is generated, using only relevant attributes. Values of those attributes that are not suitable for characterizing the collection, or not suitable generally for characterizing collections of content items of the type under consideration, are not used.

An embodiment includes selecting at least one value of each of a number of attributes, the number being based on at least one of:

user input, and results of the analysis of at least one distribution of values of an attribute over the sets of metadata associated with the respective content items.

An effect is that it is possible to adapt the volume of the metadata for association with the collection of content items to make it more or less expressive and/or representative of the entire collection of content items.

In an embodiment, the step of selecting at least one attribute value includes selecting at least one attribute by comparative analysis of distributions of values over the sets of metadata, associated with the respective content items individually, of each of a plurality of attributes.

An effect is that it is possible to select a value or values of an attribute that is or are distinctive of the collection, yet relates or relate to as many of the content items in the collection as possible.

In an embodiment, the comparative analysis includes, for each of a plurality of candidate attributes, partitioning the collection of content items into disjoint sets according to similarity of values of that candidate attribute associated with the respective content items individually and ranking the attributes according to a factor based at least on a relative size of a largest set in the partition made for the candidate attribute, with respect to a size of the collection.

An effect is that greater weight is given to attribute values that apply to many content items in the collection. It is observed that the term "similarity" does not necessarily imply identity of values. It denotes that values match according to a certain measure of similarity.

In an embodiment, the comparative analysis includes, for each of a plurality of candidate attributes, partitioning the collection of content items into disjoint sets according to similarity of values of that candidate attribute associated with the respective content items individually, and ranking the candidate attributes according to a factor based at least on how many sets are obtained for the attribute.

An effect achieved is that it is possible to weed out attributes having a wide spread of values over the content items in the collection.

In an embodiment, the candidate attributes are ranked according to a factor that is more sensitive to changes in the relative size of the largest set than to changes in the number of sets.

An effect is that weeding out of attributes is avoided that exhibit a large range of values over the collection when values other than a dominant value appear relatively infrequently.

In an embodiment, the comparative analysis includes ranking candidate attributes according to a factor based at least partly on priority values assigned to the candidate attributes.

An effect achieved is that preferably values of attributes are selected that are inherently more suitable for generating metadata descriptive of a collection of content items in general.

In a variant, the priority values are obtained by performing an analysis of distributions of values of candidate attributes over metadata associated with respective content items individually, using at least partly content items outside the collection.

An effect is that knowledge of which attributes are most suitable for use in generating metadata describing the collection of content items need not be imported. It is not necessary to know, for example, that the performing artist is the best attribute for discerning between collections. A further effect is that the potential is offered for tailoring the selection of attribute value(s) in dependence on distributions of attribute values over content items in other collections accessible to the same system for processing data included in the content items. This makes the generated metadata more suitable for searching and browsing. As an example, by analyzing other collections accessible to the same system, it can be determined that a user of the system has sorted the totality of his collection of audio files into collections according to style, e.g. a directory containing jazz tracks, a directory containing pop tracks, etc. By prioritizing style, it is more likely that a directory will be associated with metadata indicating the style of music prevalent in that directory, even where all the audio files in one directory might also be by the same performing artist.

An embodiment includes selecting a number of values of a selected attribute for processing to generate the metadata for association with the collection, wherein the number is based on at least one of:

user input, and a characteristic of the distribution of values of that attribute over the sets of metadata associated with the respective content items individually.

An effect is that a larger number of values can be chosen, where one attribute value does not pertain to a large majority of the content items in the collection.

In an embodiment, the step of processing the selected attribute value(s) to generate the metadata includes generating metadata including attribute value information corresponding to at least one selected attribute value and qualifying data based on an analysis of the distribution of values of the selected attribute over the sets of metadata associated with the respective content items individually.

An effect is that metadata are generated that are based on selected attribute values, but also indicate how relevant the selected value(s) is/are to the whole of the collection.

In an embodiment, the step of processing the selected attribute value(s) to generate the metadata includes synthesizing text data representing a descriptive phrase.

An effect is that data is provided that is suitable for use in a user interface for searching, browsing and/or managing collections of content items.

An embodiment includes, upon selection of at least one attribute value in dependence on the analysis, repeating the analysis on sets of metadata associated with respective content items in the collection other than those including at least one attribute value corresponding to the attribute value(s) selected prior to repeating the analysis.

An effect is the generation of meaningful metadata for a collection of content items comprising clusters of content items which are disparate as regards their characteristics. That is to say that, where the collection can be divided into clusters of content items such that the items within each cluster have relatively simple characteristics but the characteristics differ strongly between clusters, metadata is generated that is suitable for informing a user of this fact.

In an embodiment, the step of processing the selected attribute value(s) to generate the metadata includes processing the selected attribute value(s) to generate metadata for comparison with metadata generated for a different collection of content items and, if the metadata generated for comparison differs by less than a certain minimum, selecting at least one further attribute value in dependence on an analysis of at least one distribution of values of an attribute over the sets of metadata associated with the respective content items, wherein at least the further selected attribute value(s) is/are processed to generate the metadata for association with the collection.

An effect is the generation of metadata that are sufficiently distinctive to allow for selection between different ones of the collections of content items.

An embodiment includes determining an order of the content items in the collection according to values of an attribute of the content items, wherein the metadata for association with the collection of content items are generated such as to qualify the selected attribute value(s) based on where content items associated with a set of metadata including an attribute value corresponding to the selected attribute value(s) are situated in the order.

An effect is the generation of metadata that facilitates efficient browsing through a list of the content items in the collection. Because the metadata associated with the collection of content items includes at least one selected attribute value and information qualifying the selected attribute value(s) based on where content items associated with a set of metadata including an attribute value corresponding to the selected attribute value(s) are situated in the order, information is provided on where in a list of content items to look for content items to which the selected attribute value(s) is/are applicable. If the attribute is the year of release, the metadata may indicate that the collection includes increasingly recent items starting from the Fifties. When this metadata is made accessible to a user of a file browser, the user will know to look some way down the list for content items from the Seventies.

In an embodiment, making the generated metadata available to the system for processing data included in the content items includes storing the generated metadata in association with data maintained by a file system and identifying a group of files corresponding to the content items.

An effect is that informative tags can be added to graphical user interfaces for discovering and accessing content items, and efficient search and retrieval of content items, for example, is made possible.

In an embodiment, the step of obtaining sets of metadata associated with the content item individually, includes at least one of:

reading metadata encoded in data objects comprising the respective content items;

analyzing signals encoded in data comprised in the respective content items and suitable for rendering in perceptible form on a content presentation system in accordance with at least one pre-determined algorithm, so as to generate at least one attribute value;

analyzing respective locations from which data corresponding to the content items can be obtained, so as to generate at least one attribute value; and obtaining identifications of the content items, submitting the identifications to a database system remote from the system for processing data included in the content items, and obtaining the respective sets of metadata from the database system.

An effect is that the method is made well suited for implementation in an automated system.

According to another aspect, the system for automatically generating metadata for association with a collection of content items according to the invention is configured:

to obtain sets of metadata associated with the content items individually, each set of metadata including at least one attribute value associated with the content item, to analyze at least one distribution of values of an attribute over the sets of metadata associated with the respective content items, to select at least one attribute value in dependence on the analysis, and to process the selected attribute value(s) to generate the metadata for association with the collection.

The system is suitable for automatically generating efficient and accurate descriptions of collections of content items.

An embodiment of the system is configured to carry out a method according to the invention.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the drawings, in which.

DETAILED DESCRIPTION OF THE EMBODIMENTS

Figure 1:
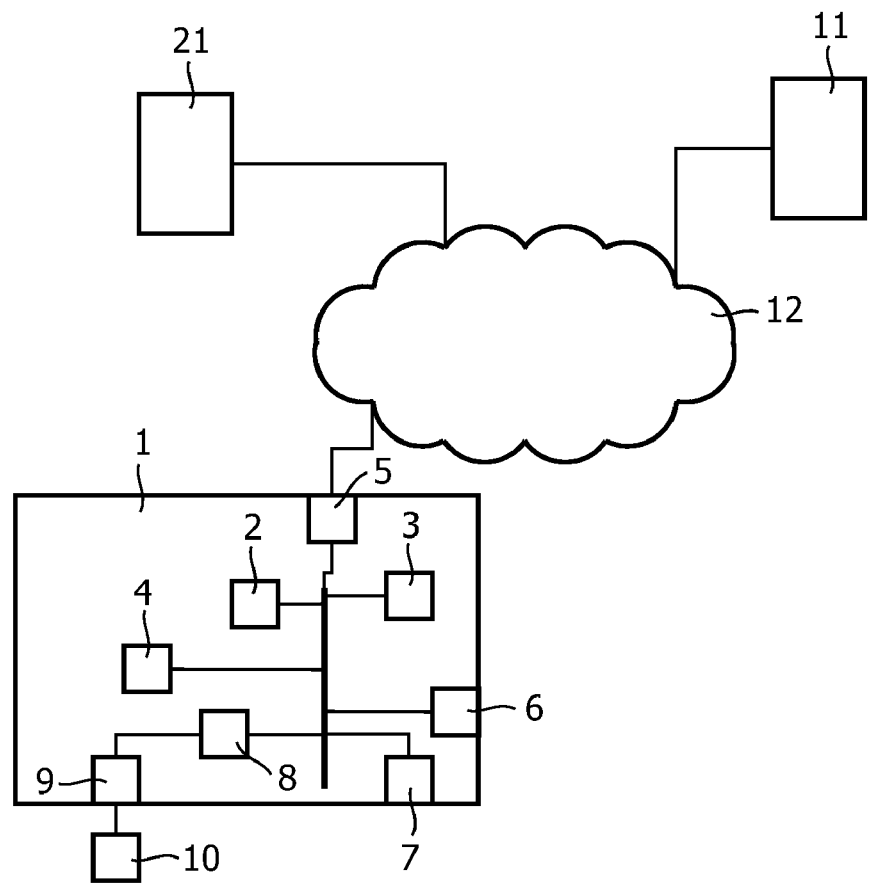
FIG. 1 is a schematic diagram of a networked computer environment for implementing a method of automatically generating metadata.

As illustrated in FIG. 1, a computer 1 includes a processor 2, main memory 3, a data storage device 4 and a network interface 5. The computer 1 can be implemented as a general-purpose personal computer, a media player, for example a portable media player, or a similar portable device such as a Personal Digital Assistant or smart phone. The data storage device 4 can be a fixed disk drive, an interface to a memory device, etc.

A graphical user interface is provided by means of user controls 6 and a graphical output device 7. Also illustrated are a digital signal processor 8, audio output device 9 and loudspeaker 10 for rendering audio signals in perceptible form.

The audio signals are comprised in audiovisual media files stored in the data storage device 4 or on a content item server 11 in communication with the computer 1 through a network 12, e.g. the Internet.

In an embodiment, the computer 1 is arranged to store software comprising instructions enabling the computer 1 to provide a user interface for managing, searching for, browsing and playing back audio and/or video signals comprised in the audiovisual media files. The computer 1 is also configured to generate metadata for association with a collection of audiovisual media files accessible to the computer 1, based on sets of metadata associated with the audiovisual media files individually.

Figure 2:
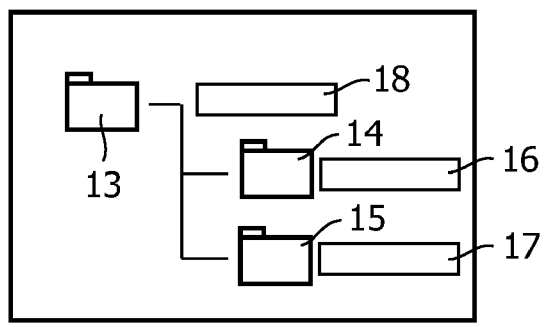
FIG. 2 is a simplified screen view of a graphical user interface using the automatically generated metadata.

The graphical user interface provided by the computer 1 may make the audiovisual media files available for browsing in a manner illustrated in FIG. 2. FIG. 2 shows how the audiovisual media files are organized hierarchically in directories and sub-directories, represented by folders 13, 14, 15. To enable a user to select one of two folders 14,15 to view a list of the audiovisual media files organized under that folder, tags 16,17 are generated and provided to the software implementing the graphical user interface, which displays the tags 16,17.

The computer 1 generates the tags 16,17 automatically, on the basis of metadata associated with audiovisual media files that it finds have been organized under the respective folders 14,15. In an embodiment, the tags 16,17 are generated anew when the composition of the collection of audiovisual media files referred to by one of the folders 14,15 changes. Data representing each of the lower-level folders 14,15 in turn represent two content items, each associated with an individual set of metadata in the form of the tags 16,17. When one of the tags 16,17 changes, the contents of a tag 18 associated with a folder 13 representing the directory under which the directories represented by the other folders 14,15 are organized are also updated. Essentially the same method is used for this.

Figure 3:
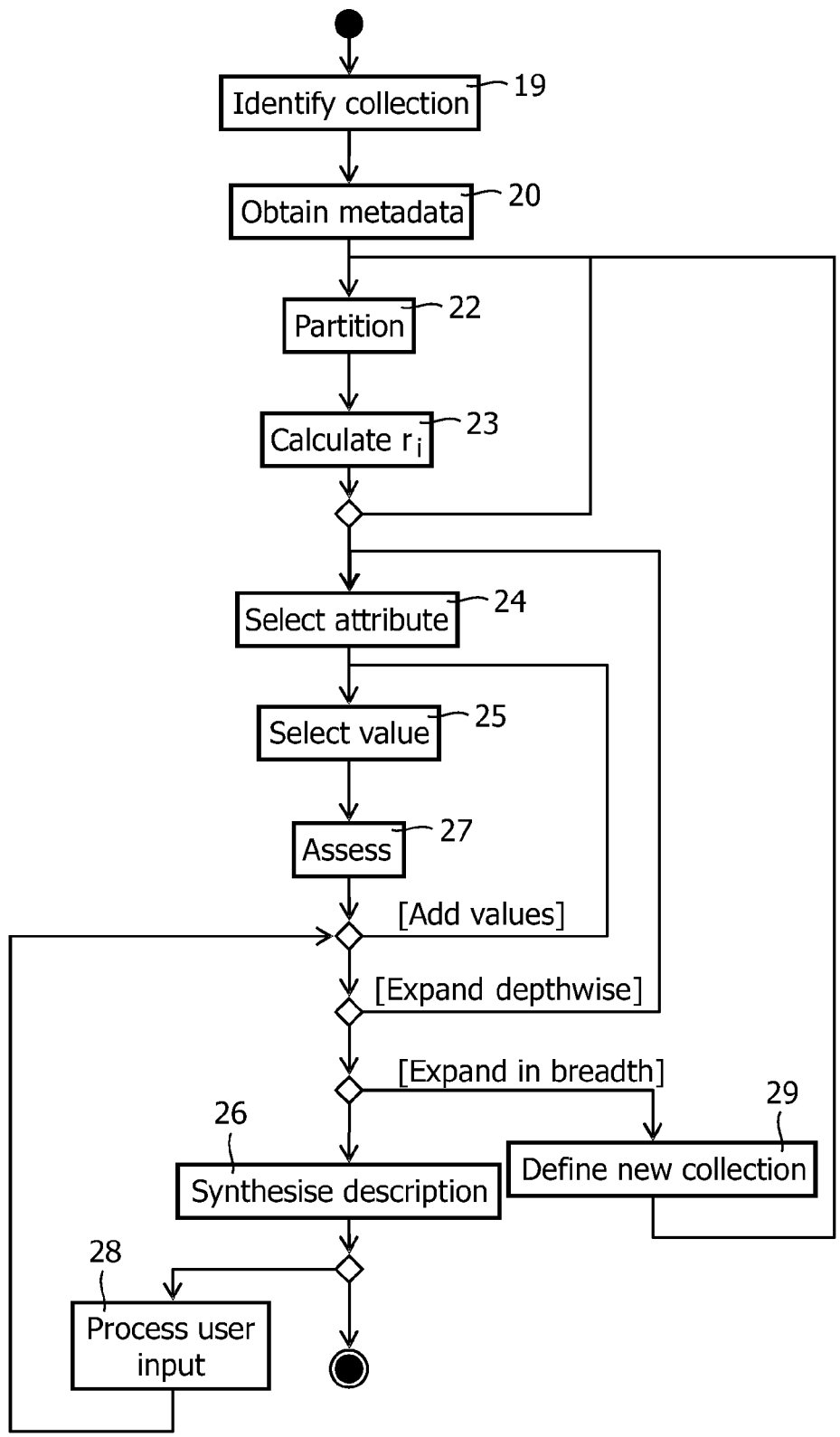
FIG. 3 is a flow chart illustrating an embodiment of a method of automatically generating metadata.

FIG. 3 illustrates how the metadata represented by one of the tags 16,17 are generated.

In a first step 19, the audiovisual media files of which the collection is composed are identified. To this end, the computer 1 can use data maintained by a file system for implementing a hierarchical directory structure. This data is maintained for hierarchical organization, manipulation, navigation, access and retrieval of data. Examples include data used to maintain the physical location of files in the data storage device 4, data used to provide access to files on the content item server 11 or data used in an access method for virtual data, e.g. data objects maintained on a temporary basis in main memory 3. The file system defines a grouping of audiovisual media files, determined by users of the computer 1 and content item server 11. The definition is used by the computer 1 to identify without human intervention which files belong to a collection of interest.

In an alternative embodiment, each audiovisual media file includes or is linked to metadata identifying at least one collection of which the file is a member. In such an embodiment, the step 19 of identifying the audiovisual media files forming the collection is performed by searching the metadata for data identifying the collection.

In a next step 20, the computer 1 obtains sets of metadata associated with some or all of the audiovisual media files in the collection individually. The metadata is obtained in the form of an (attribute,value) pair. Each set of metadata includes at least one such pair, but it is not necessary that an attribute be represented in an (attribute,value) pair in each set of metadata. The computer 1 may add an (attribute,value) pair including a dummy value to a set of metadata lacking a value for a particular attribute to be considered in subsequent steps.

In one embodiment, values of at least one attribute are obtained by analyzing signals encoded in data comprised in the audiovisual media files and suitable for rendering in perceptible form by the computer 1. That is to say that the audio and/or video signals contained in the audiovisual media files are analyzed according to a pre-determined algorithm. Suitable algorithms for audio signals include those suitable for quantifying tempo, loudness, bass, pitch, brightness, bandwidth and Mel-frequency cepstral coefficients and the like. Suitable algorithms for video signals include those suitable for quantifying brightness, resolution, color or color distribution, scene change tempo and the like.

In addition, or alternatively, the step 20 of obtaining sets of metadata associated with the audiovisual media files individually can include reading metadata encoded in data objects comprising content items. For example, ID3 tags appended to audio files can be read to determine the title, artist, album, or genre of an audio track. Alternatively, a description in accordance with the MPEG-7 standard and attached to the audiovisual media files can be read to obtain the metadata (in that case, the description and audiovisual media file together form a data object). In yet another alternative, the metadata can be obtained from Electronic Program Guide data included in a bouquet of digital broadcast streams.

In embodiments, the metadata can be dependent on the current user of the computer 1. It can, for example, contain a recommender's rating (linked to a user profile), or data representative of usage history (how many times or for how long the file has been accessed from the computer 1, for example).

Another manner in which metadata can be obtained is by submitting, via the network 12, identifications of the content items corresponding to the audiovisual media files to a metadata server 21 hosting a database. Examples of services using such a metadata server 21 include the Gracenote Media Database. An embodiment in which Electronic Program Guide data is downloaded would work in a substantially similar fashion.

A further way in which sets of metadata associated with the audiovisual media files can be obtained is by analyzing respective locations from which they can be obtained. For example, characteristics of the files, such as file type, data, size and storage address can be determined.

For each of some or all attributes represented in the sets of metadata associated with the audiovisual media files, at least one distribution of values of an attribute over the sets of metadata associated with the respective files individually is analyzed and at least one attribute value—this may be a range of values—is selected in dependence on the analysis. In fact, at least one value of each of one or more attributes is taken, but a selection of fewer than all attributes having values in the sets of metadata associated with the audiovisual media files individually is generally made. To this end, the suitability of the attributes represented in the sets of metadata is assessed by comparative analysis of distributions of values of some or all of the attributes (the "candidate attributes" hereinafter) over the sets of metadata associated with the audiovisual media files individually.

For each candidate attribute, the collection of audiovisual media files is partitioned (step 22) into disjoint sets according to similarity of values in the (attribute,value) pairs for that attribute associated with the audiovisual media files. Similarity may mean that the files are associated with the same value or that they are associated with a value in the same one of a number of ranges, in the case of continuous values. Continuous values can be classed as similar or not, using pre-defined categories (e.g. decades for the attribute year of release). Alternatively, a clustering algorithm can be applied based on the values appearing in the sets of metadata associated with the audiovisual media files individually. In any case, the disjoint sets of a partition are each characterized by a common attribute value or a common inferred relationship between attribute values.

As an example, take a collection of ten audio tracks characterized by the attributes genre, artist and year of release, as represented in Table 1.

TABLE 1

| Song ID | Genre | Artist | Year |
|---------|-------|--------|------|
| 1 | Pop | Madonna | 1986 |
| 2 | Pop | Madonna | 1989 |
| 3 | Pop | Madonna | 1998 |
| 4 | Pop | Madonna | 2003 |
| 5 | Pop | Britney Spears | 1999 |
| 6 | Pop | Britney Spears | 2001 |
| 7 | Rock | Deep Purple | 1968 |
| 8 | Rock | Deep Purple | 1970 |
| 9 | Jazz | Miles Davis | 1963 |
| 10 | Jazz | Pat Metheny | 1992 |

The computer 1 will generate a partition {[1,2,3,4,5,6], [7,8], [9,10]} based on the genre values Pop, Rock and Jazz. It will also generate a partition {[1,2,3,4], [5,6], [7,8], [9,10]} into five sets based on artist, and a partition {[7,9], [8], [1,2], [3,5,10] [4,6]} into five sets based on the decade into which the years of release fall.

In a next step 23, the candidate attributes are assigned a rank according to a factor $r_i$, where i is an index into the candidate attribute. In the example used herein, the factor $r_i$ is based on the relative size $S_i$ of the largest set in the partition for candidate attribute i with respect to the number of audiovisual media files in the collection, on the number $n_i$ of sets obtained for the candidate attribute, and on a priority value $P_i$ assigned to the candidate attribute i. In particular, the factor is calculated according to the following formula:

$$r_i = \frac{S_i}{\sqrt{n_i}} P_i.$$

This formula is an example. Another formula may be used, in particular a formula having the property that the factor $r_i$ is more sensitive to changes in the relative size $S_i$ of the largest set in the partition made for the candidate attribute i than to changes in the number $n_i$ of sets. In the case of the formula used here as an example, the factor $r_i$ is directly proportional to the relative size of the largest of the disjoint set in the partition. It is inversely proportional to the square root of the number $n_i$ of sets in the partition.

The fact that certain attributes are more useful for describing a collection is reflected in the priority values $P_i$. Thus, the priority values $P_i$ reflect a priori preferences for having descriptions based on certain attributes that are more commonly used to characterize audiovisual media files. For example, the artist is more commonly referred to than the decade in which a song was released.

In an embodiment, the computer 1 is operable to adjust the priority values based on user input. User settings reflect the preferences for certain attributes over others in describing audiovisual media files and/or collections thereof.

As an enhancement or alternative, the priority values $P_i$ can reflect how discriminative a certain attribute is in an entire database of which the collection for which the metadata is to be generated is only a sub-set. In that case, the priority values $P_i$ are obtained by performing an analysis of distributions of values of candidate attributes over metadata associated with respective audiovisual media files individually, using at least partly audiovisual media files not comprised in the collection.

After the two steps 22,23 just described have been repeated for all of the candidate attributes, the candidate attribute with the highest factor $r_i$ is selected (step 24) and the value or values common to the largest set of the partition made for that attribute is or are selected (step 25). In the example underlying Table 1, if the priority value for the attribute artist is 0.8 and that for the attribute genre is 0.4, the top-ranked attribute will be artist, and the selected value will be Madonna.

In a simple embodiment, the method proceeds straight to a step 26 in which the selected attribute value is processed to generate descriptive metadata for the collection. This may entail nothing more than assigning the selected attribute value(s) to the collection and passing that value or those values to the user interface for generating one of the tags 16,17. However, in particular for applications involving a user interface, it is more informative if text data representing a descriptive phrase is generated.

In the example used herein, the step 26 of synthesizing text data representing a descriptive phrase includes generating metadata including attribute value information corresponding to the selected attribute value or values and qualifying data based on the analysis of the distribution of values of the attribute over the sets of metadata associated with the audiovisual media files individually. In an embodiment, the descriptive phrase is generated according to a template. In the embodiment discussed herein in more detail, the textual description is based on the distribution of the values for the top-ranked attributes and a pre-defined set of grammar rules.

These rules can be represented in BNF-format (Backus-Naur form: a metasyntax used to express context-free grammars) as follows:

```
<collection description>::= <set description> {"and" <set description>}
<set description>::=<quantifier><item type>[<attribute>] <value>
                {<value>} | <item type> "of various" <attribute>
<quantifier>::=<absolute> | <relative> | <NIL>
<absolute>::=<absolute quantitative> | <absolute qualitative>
<relative>::=<relative quantitative> | <relative qualitative>
<item type>
```

The terminals are, for the English language:

```
<attribute>: "genre", "artist", "year"
<value>: "pop", "jazz", "Madonna", "Miles Davis", "Like a Virgin",
"1989", etc.
<absolute quantitative>: "2", "3", "90", "a dozen", etc.
<absolute qualitative>: "many", "a few", "a bunch of", etc.
<relative quantitative>: "80%", "one third", "half", etc.
<relative qualitative>: "mostly", "mainly", etc.
<item type>: "songs", "files", "films", "videos", etc.
```

The rules of the grammar work out as follows. The <attribute> to use in <set description> is the one selected in the earlier step 24. If the partition generated for this selected attribute has only one set (e.g. only songs by Madonna), only this attribute is used. Depending on a pre-set option, a relative or absolute quantifier can be used. For example, the absolute quantitative version would result in the description: "Four songs by artist Madonna" or: "Four songs by Madonna". The relative quantitative version would be: "Only songs by Madonna".

If the partition made for the highest-ranking candidate attribute has two or three largest sets of similar size, then the step 25 of selecting a value or range of values includes selecting the value associated with the next-largest set or sets of the partition. The description synthesized in the final step 26 then is the concatenation of descriptions of two or more sets, for example: "Fifty songs by the Beatles and forty songs by the Rolling Stones" or: "Mostly songs by the Beatles and the Rolling Stones". If the partition made for the highest-ranking candidate attribute has no set larger than a pre-determined minimum, then a description according to the syntax <item type> "of various" <attribute> may be generated, for example: "Songs by various artists". In that case, no values are selected.

Depending on the language and on the particular attributes selected, the grammar can include variations that improve the readability of the description that is synthesized. For example, the attribute selected may trigger a different construction of the sentence forming the description. Different grammars can be used depending on the application, the language, user preference, the type of data, etc.

In an embodiment, the step 26 of generating metadata for association with the collection of audiovisual media files includes determining an order of the files according to values of an attribute of the files, and generating the metadata such as to qualify the selected attribute value or values based on where the files associated with a set of metadata including the selected attribute value or values are situated in the order. For example, a playlist can be seen as a collection of audio or video data objects sorted in the order in which they are played, a television channel listing can be seen as a collection of program items sorted according to when they will be broadcast, etc. The synthesized description can reflect the order, for example by creating a description like: "Ten rock songs, followed by five jazz songs and three Latin songs", where the attribute "genre" has been selected.

It will be clear from the foregoing that attributes can be continuous (such as the year of release of a song), comprise sorted sets (such as {Fifties, Sixties, Seventies, Eighties}), or comprise purely descriptive attributes (such as artist's names). The quantifier used in the description of the collection can be absolute (without reference to the content items in the collection to which the attribute value does not apply) or relative. The quantifier may be quantitative (a number, value) or qualitative (a description). Table 2 gives some examples of descriptions of collections generated for various types of attributes.

TABLE 2

| Attribute based on | Type of qualification of selected attribute value | Descriptive phrase |
| --- | --- | --- |
| Recommender's output | Absolute quantitative | "5 movies that you like and 3 you might like and 2 your girlfriend might like" |
| Resources occupied | Absolute quantitative and relative quantitative | "3 films occupying 30% of the total storage space" |
| Size and resolution | Absolute quantitative | "3 high-definition films of 1 hour and 3 standard definition films of 2 hours" |
| Sharing | Absolute quantitative | "5 files shared with Alice and 3 files received by Bob" |
| Cost, price, source | Absolute quantitative and absolute qualitative | "10 $ 9.99 albums and a few songs downloaded from music portal A" |
| Sub-genre information obtained by means of content analysis | Absolute quantitative and relative qualitative | "3 films with mostly action and some romantic scenes" |
| Extracted keywords from EPG description | Absolute quantitative and relative qualitative | "5 films mainly about war and heroes or mafia" |

In addition to those listed in Table 2 the attributes may also be based on ownership, privacy protection level, location, device name, URL (Uniform Resource Locator), similarity measure or extra information from external sources, such as where audio tracks are in a hit parade.

The method illustrated in FIG. 3 includes a step 27 of assessing the selection of attribute values to determine whether or not to expand a basic description, or modify it. In particular, a comparison may be made with metadata generated for a different collection of audiovisual media files (the other one of the folders 14,15 or the total collection represented by the higher-ranking folder 13, for example). If the metadata generated for comparison differs by less than a certain minimum, a further attribute or a further value or range of values of an already selected attribute is selected.

One option is to allow for expansion in depth. According to this option, a value or range of values is selected of each of a number of attributes, wherein the number is based on at least one of user input and results of the analysis of the distributions of values of candidate attributes over the sets of metadata associated with the audiovisual media files individually. In particular, it may be determined that the attribute artist can be selected in addition to the attribute genre. This might lead to a description such as: "Ten folk songs by Bob Dylan", starting from an initial description: "Ten folk songs". In one embodiment, a description is initially synthesized on the basis of at least one value of the highest-ranking one of the number of candidate attributes. This description is displayed as one of the tags 16,17 next to the folders 14,15 in the user interface. In response to user input, processed in a subsequent step 28, the steps 24, 25, 26 of selecting an attribute—in this case a further attribute—a value or range of values thereof and of synthesizing a description are repeated.

Some attributes can be organized hierarchically in a taxonomy, meaning that certain values subsume a number of other values or ranges of other values. As an example, the values "bebop", "swing", "ragtime" and "jazz-fusion" are all examples of the value "jazz" of the attribute "style". In an embodiment, when the step 25 of selecting a value is repeated following an assessment by evaluation of rules or following user input, a value or value range from among a number of values or value ranges associated with a higher-ranking value or value range in a hierarchy of attribute values is selected in response to user input, an assessment of the distribution of values over the sets of metadata associated with the audiovisual media files in the collection individually or an assessment of the attribute values selected for a different collection of audiovisual media files.

Another option is to select the number of values of a selected attribute in dependence on at least one of user input and results of the analysis of the distributions of values of candidate attributes over the sets of metadata associated with the audiovisual media files individually. This has already been described for the case in which there is no dominant set in the partition made for the selected attribute. The value(s) of the selected attribute associated with a further set in the partition may also be selected as a result of the step 28 of processing user input received after an initial description has been made available. Combinations of the two options are used in the illustrated embodiment.

Another way of generating a more refined description is illustrated according to which, following the steps 24,25 of selecting an attribute and a value or range of values thereof, a new collection is defined (step 29). It consists of audiovisual media files in the collection other than those including at least one attribute value corresponding to the already selected value or range of values. Then, for each of a plurality of candidate attributes, the new collection of audiovisual media files is partitioned (step 22) into disjoint sets according to similarity of values of that candidate attribute associated with the respective audiovisual media files in the new collection individually. The factors $r_i$ for establishing a ranking of attributes are re-calculated (step 23) based on the relative size of the largest set in the partition made, the priority factor and the number of sets in the partition. A further attribute is selected, as well as a value thereof, so as to generate an expanded description of the entire collection of audiovisual media files. The result might be something like: "Mostly action films and 2 films by Martin Scorsese". The step 29 of defining a new collection can be carried out as a result of the assessment of the applicability of previously selected attribute value(s) or as a result of user input. Thus, in summary, this method first determines that most of the audiovisual media files are action films, then applies the same kind of analysis to all of the audiovisual media files that are not action films, and determines that they are best characterized by specifying that they include two films by Martin Scorsese.

A complete example of a collection for which this metadata is calculated is given in Table 3.

TABLE 3

| | Attribute 1, title | Attribute 2, genre | Attribute 3, cast | Attribute 4, director |
|---|---|---|---|---|
| Attribute Priority | | | | |
| | Terminator 1 | Action | Schwarzenegger | Cameron |
| | Terminator 2 | Action | Schwarzenegger | Cameron |
| | Terminator 3 | Action | Schwarzenegger | Mostow |
| | Commando | Action | Schwarzenegger | Lester |
| | Predator | Action | Schwarzenegger | McTiernan |
| | The Running Man | Action | Schwarzenegger | Glaser |
| | Total Recall | Action | Schwarzenegger | Verhoeven |
| | True Lies | Action | Schwarzenegger | Cameron |
| | Taxi Driver | Crime | Robert de Niro | Scorsese |
| | The Color of Money | Drama | Paul Newman | Scorsese |
| # sets | 10 | 3 | 3 | 7 |
| Relative sizes | 10% (10) | [0.8, 0.1, 0.1] | [0.8, 0.1, 0.1] | [0.3, 0.2, 0.1, ..., 0.1] |

The factors $r_i$ would work out as:

$$r_1 = \frac{0.1}{\sqrt{10}} P_1 = 0.03 P_1 = 0.003;$$

$$r_2 = \frac{0.8}{\sqrt{3}} P_2 = 0.46 P_2 = 0.41;$$

$$r_3 = \frac{0.8}{\sqrt{3}} P_3 = 0.46 P_3 = 0.32;$$

and $$r_4 = \frac{0.30}{7} P_4 = 0.11 P_4 = 0.06.$$

Based on these factors, the attributes are ranked as: genre, cast, director, title. The initial description would be, for example: "Mostly action films". Then, the items to which the selected attribute value applies are removed, so that the items in Table 4 are left.

TABLE 4

| | Attribute 1, title | Attribute 2, genre | Attribute 3, cast | Attribute 4, director |
|---|---|---|---|---|
| Attribute priority | 0.1 | 0.9 | 0.7 | 0.5 |
| | Taxi Driver | Crime | Robert de Niro | Scorsese |
| | The Color of Money | Drama | Paul Newman | Scorsese |
| # Sets | 2 | 2 | 2 | 1 |
| Relative sizes | [0.5, 0.5] | [0.5, 0.5] | [0.5, 0.5] | 1 |

The factors $r_i$ that then result are as follows:

$$r_1 = \frac{0.5}{\sqrt{2}} P_1 = 0.35 P_1 = 0.035;$$

$$r_2 = \frac{0.5}{\sqrt{2}} P_2 = 0.35 P_2 = 0.32;$$

$$r_3 = \frac{0.5}{\sqrt{32}} P_3 = 0.35 P_3 = 0.25;$$

and $$r_4 = \frac{1}{\sqrt{1}} P_4 = P_4 = 0.5.$$

The new ranked list of attributes is: director, genre, cast, title. The new description therefore becomes: "Mostly action films and 2 films by Martin Scorsese".

It is observed that metadata for association with the collection of audiovisual media files grouped under the folder 13 at the higher level in the directory structure of the computer 1 can be automatically generated in one of two ways, using the same method as illustrated in FIG. 3. Either the method is applied to the total collection of files defined by all files grouped under any of the lower level folders 14,15, or sets of metadata are first generated for each of the folders 14, 15, which themselves can be seen as content items, and the method is applied to the collection of folders 14, 15. In any case, human intervention is limited to optional refinement of the generated descriptive metadata, and to organizing the files into folders in the first place. Otherwise, the method is completely automated.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The method illustrated herein has a broad range of applications. It can be applied to the user interface of any storage device, portable device, database system, file system or data mining system. It can be used to generate descriptions for collections of content stored in consumer electronics devices, for television channel listings, for personal radio or television channels, for music playlists, for publications and generally any electronic data set that is or can be characterized by (attribute,value) pairs.

'Means', as will be apparent to a person skilled in the art, are meant to include any hardware (such as separate or integrated circuits or electronic elements) or software (such as programs or parts of programs) which perform in operation or are designed to perform a specified function, be it a single function or one performed in conjunction with other functions, be it in isolation or in co-operation with other elements. 'Computer program' is to be understood to mean any software product stored on a computer-readable medium, such as an optical disk, downloadable via a network, such as the Internet, or marketable in any other manner.

The invention claimed is:

1. Method of automatically generating metadata for association with a collection of content items accessible to a processing system for processing data included in the content items, including:
   in the processing system,
   obtaining sets of metadata associated with the content items individually, each set of metadata including at least one attribute value associated with the content item,
   analyzing at least one distribution of values of an attribute over the sets of metadata associated with the respective content items,
   selecting at least one attribute value in dependence on the analysis, processing the selected attribute value(s) to generate the metadata for association with the collection, and making the generated metadata available to the processing system for processing data included in the content items in connection with an identification of the collection of content items, wherein the step of selecting at least one attribute value includes selecting at least one attribute by comparative analysis of distributions of values over the sets of metadata associated with the respective content items individually of each of a plurality of attributes.

2. Method according to claim 1, including identifying the content items included in the collection using data maintained by a hierarchical file system.

3. Method according to claim 1, wherein selecting at least one attribute value in dependence on the analysis includes selecting at least one value of fewer than all attributes having values included in sets of metadata associated with content items in the collection individually.

4. Method according to claim 3, including selecting at least one value of each of a number of attributes, the number being based on at least one of:
   user input, and
   results of the analysis of at least one distribution of values of an attribute over the sets of metadata associated with the respective content items.

5. Method according to claim 1, wherein the comparative analysis includes, for each of a plurality of candidate attributes,
   partitioning the collection of content items into disjoint sets according to similarity of values of that candidate attribute associated with the respective content items individually, and
   ranking the attributes according to a factor based at least on a relative size of a largest set in the partition made for the candidate attribute, with respect to a size of the collection.

6. Method according to claim 1, wherein the comparative analysis includes ranking candidate attributes according to a factor based at least partly on priority values assigned to the candidate attributes.

7. Method according to claim 1, including selecting a number of values of a selected attribute for processing to generate the metadata for association with the collection, wherein the number is based on at least one of:
   user input, and
   a characteristic of the distribution of values of that attribute over the sets of metadata associated with the respective content items individually.

8. Method according to claim 1, wherein the step of processing the selected attribute value(s) to generate the metadata includes generating metadata including attribute value information corresponding to at least one selected attribute value and qualifying data based on an analysis of the distribution of values of the selected attribute over the sets of metadata associated with the respective content items individually.

9. Method according to claim 1, wherein the step of processing the selected attribute value(s) to generate the metadata includes synthesizing text data representing a descriptive phrase.

10. Method according to claim 1, including, upon selecting at least one attribute value in dependence on the analysis, repeating the analysis on sets of metadata associated with respective content items in the collection other than those including at least one attribute value corresponding to the attribute value(s) selected prior to repeating the analysis.

11. Method according to claim 1, wherein the step of processing the selected attribute value(s) to generate the metadata includes processing the selected attribute value(s) to generate metadata for comparison with metadata generated for a different collection of content items and, if the metadata generated for comparison differs by less than a certain minimum, selecting at least one further attribute value in dependence on an analysis of at least one distribution of values of an attribute over the sets of metadata associated with the respective content items, wherein at least the further selected attribute value(s) is/are processed to generate the metadata for association with the collection.

12. Method according to claim 1, wherein making the generated metadata available to the system 1 for processing data included in the content items includes storing the generated metadata in association with data maintained by a file system and identifying a group of files corresponding to the content items.

13. System for automatically generating metadata for association with a collection of content items, comprising:
   a processor to obtain sets of metadata associated with the content items individually, each set of metadata including at least one attribute value associated with the content item, analyze at least one distribution of values of an attribute over the sets of metadata associated with the respective content items, select at least one attribute value in dependence on the analysis, and process the selected attribute value(s) to generate the metadata for association with the collection, wherein the selecting at least one attribute value includes selecting at least one attribute by comparative analysis of distributions of values over the sets of metadata associated with the respective content items individually of each of a plurality of attributes.

14. Computer-readable, non-transitory medium directly loadable into the memory of a programmable device, having software code portions for performing, when said code portions are run on the device, automatically generating metadata for association with a collection of content items accessible to a processing system for processing data included in the content items, the medium comprising code for:
   obtaining sets of metadata associated with the content items individually, each set of metadata including at least one attribute value associated with the content item,
   analyzing at least one distribution of values of an attribute over the sets of metadata associated with the respective content items,
   selecting at least one attribute value in dependence on the analysis,
   processing the selected attribute value(s) to generate the metadata for association with the collection, and
   making the generated metadata available to the processing system for processing data included in the content items in connection with an identification of the collection of content items, wherein the step of selecting at least one attribute value includes selecting at least one attribute by comparative analysis of distributions of values over the sets of metadata associated with the respective content items individually of each of a plurality of attributes.

* * * * *